(12) United States Patent
Davidsson et al.

(10) Patent No.: US 11,359,923 B2
(45) Date of Patent: Jun. 14, 2022

(54) ALIGNING CONTENT PLAYBACK WITH VEHICLE TRAVEL

(71) Applicant: Volvo Car Corporation, Gothenburg (SE)

(72) Inventors: Staffan Davidsson, Västra Frölunda (SE); Vincent Tollesson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 543 days.

(21) Appl. No.: 16/369,606

(22) Filed: Mar. 29, 2019

(65) Prior Publication Data

US 2020/0309547 A1   Oct. 1, 2020

(51) Int. Cl.
| | | |
|---|---|---|
| G01C 21/34 | (2006.01) | |
| G06F 16/68 | (2019.01) | |
| G06F 16/783 | (2019.01) | |
| G06F 16/2457 | (2019.01) | |

(52) U.S. Cl.
CPC ..... G01C 21/3415 (2013.01); G01C 21/3453 (2013.01); G06F 16/24578 (2019.01); G06F 16/686 (2019.01); G06F 16/783 (2019.01)

(58) Field of Classification Search
CPC ............ G01C 21/3415; G01C 21/3453; G06F 16/783; G06F 16/24578; G06F 16/686
USPC .......................................................... 701/411
See application file for complete search history.

(56) References Cited

U.S. PATENT DOCUMENTS

| | | | |
|---|---|---|---|
| 8,121,784 B2 | 2/2012 | Templeton et al. | |
| 9,088,572 B2 | 7/2015 | Ricci | |
| 9,390,757 B2 | 7/2016 | Shahraray et al. | |
| 9,798,509 B2 | 10/2017 | Pangulur et al. | |
| 9,956,876 B2 | 5/2018 | Wu et al. | |
| 10,067,988 B2 | 9/2018 | Choksi et al. | |
| 2005/0172230 A1 | 8/2005 | Burk et al. | |
| 2010/0184005 A1 | 7/2010 | Eklund et al. | |
| 2010/0274410 A1 | 10/2010 | Tsien et al. | |
| 2011/0099519 A1 | 4/2011 | Ma et al. | |

(Continued)

FOREIGN PATENT DOCUMENTS

CN          104813680 A      7/2015

OTHER PUBLICATIONS

Non final office action received for U.S. Appl. No. 16/369,227 dated Aug. 10, 2020, 40 pages.

(Continued)

*Primary Examiner* — Gertrude Arthur Jeanglaude
(74) *Attorney, Agent, or Firm* — Amin, Turocy & Watson, LLP

(57) ABSTRACT

Techniques regarding aligning content playback with a vehicle's estimated travel time are provided. For example, one or more embodiments described herein can comprise a system, which can further comprise a processor that executes computer executable components stored in memory. The system can also comprise a travel component that can receive information regarding vehicle navigation. Further, the system can comprise a ranking component that can rank relevancy of classified content based upon preferences and context of an entity in a vehicle. Moreover, the system can comprise a content selection component that can select a first set of content for play to the entity based in part on estimated travel time of the vehicle and the relevancy of the classified content.

30 Claims, 12 Drawing Sheets

(56) References Cited

U.S. PATENT DOCUMENTS

| | | |
|---|---|---|
| 2013/0091054 A1 | 4/2013 | Nathan et al. |
| 2013/0132172 A1 | 5/2013 | Liu et al. |
| 2014/0188920 A1 | 7/2014 | Sharma et al. |
| 2015/0030998 A1 | 1/2015 | Liu et al. |
| 2015/0074022 A1 | 3/2015 | Cornelius et al. |
| 2015/0127818 A1 | 5/2015 | Bates et al. |
| 2018/0188054 A1 | 7/2018 | Kennedy et al. |
| 2018/0357233 A1 | 12/2018 | Daze et al. |
| 2020/0311119 A1* | 10/2020 | Ronnang .............. G06F 16/637 |

OTHER PUBLICATIONS

Final office action received for U.S. Appl. No. 16/369,227 dated Dec. 22, 2020, 40 pages.
Non Final office action received for U.S. Appl. No. 16/369,227 dated May 10, 2021, 43 pages.

* cited by examiner

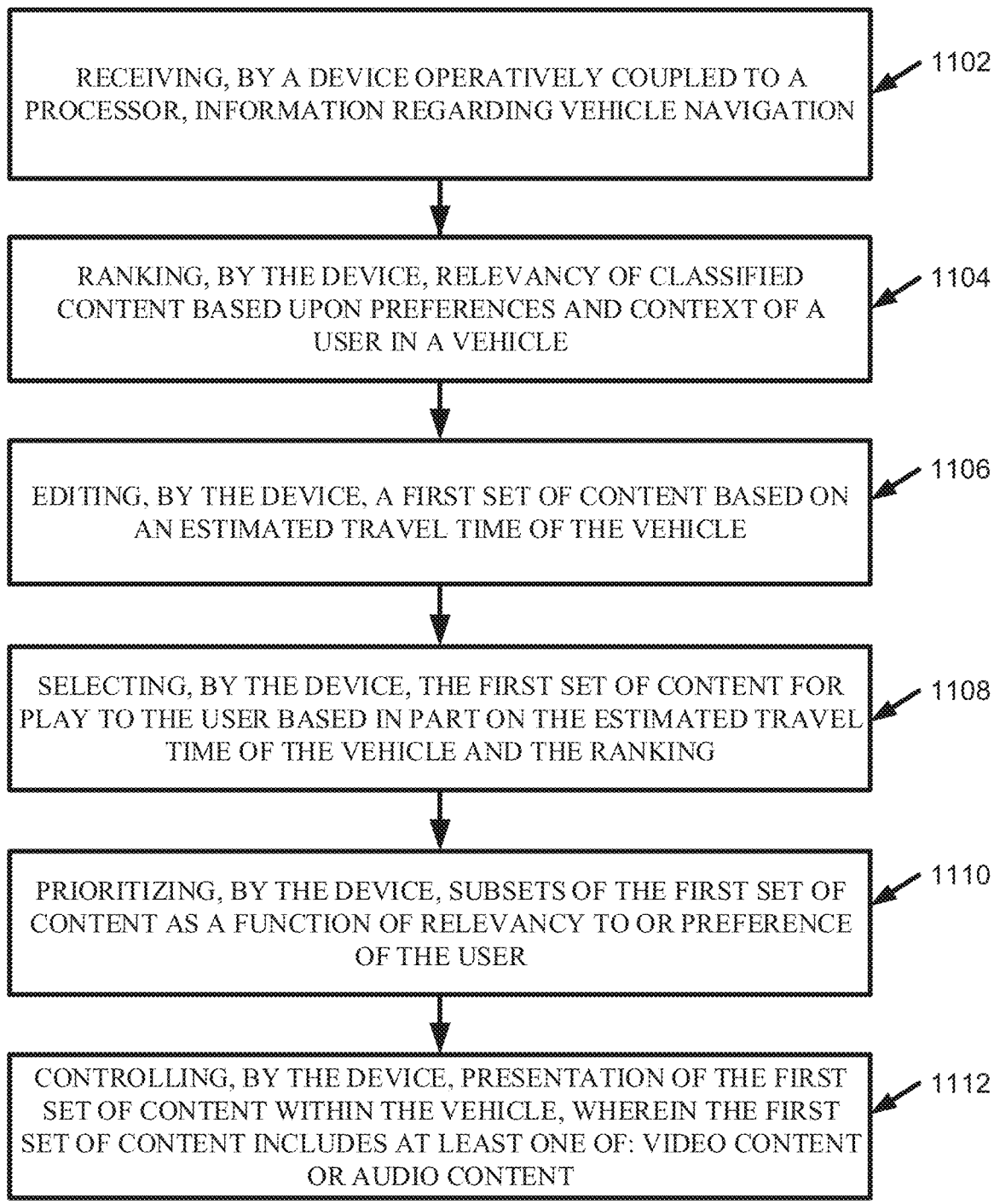

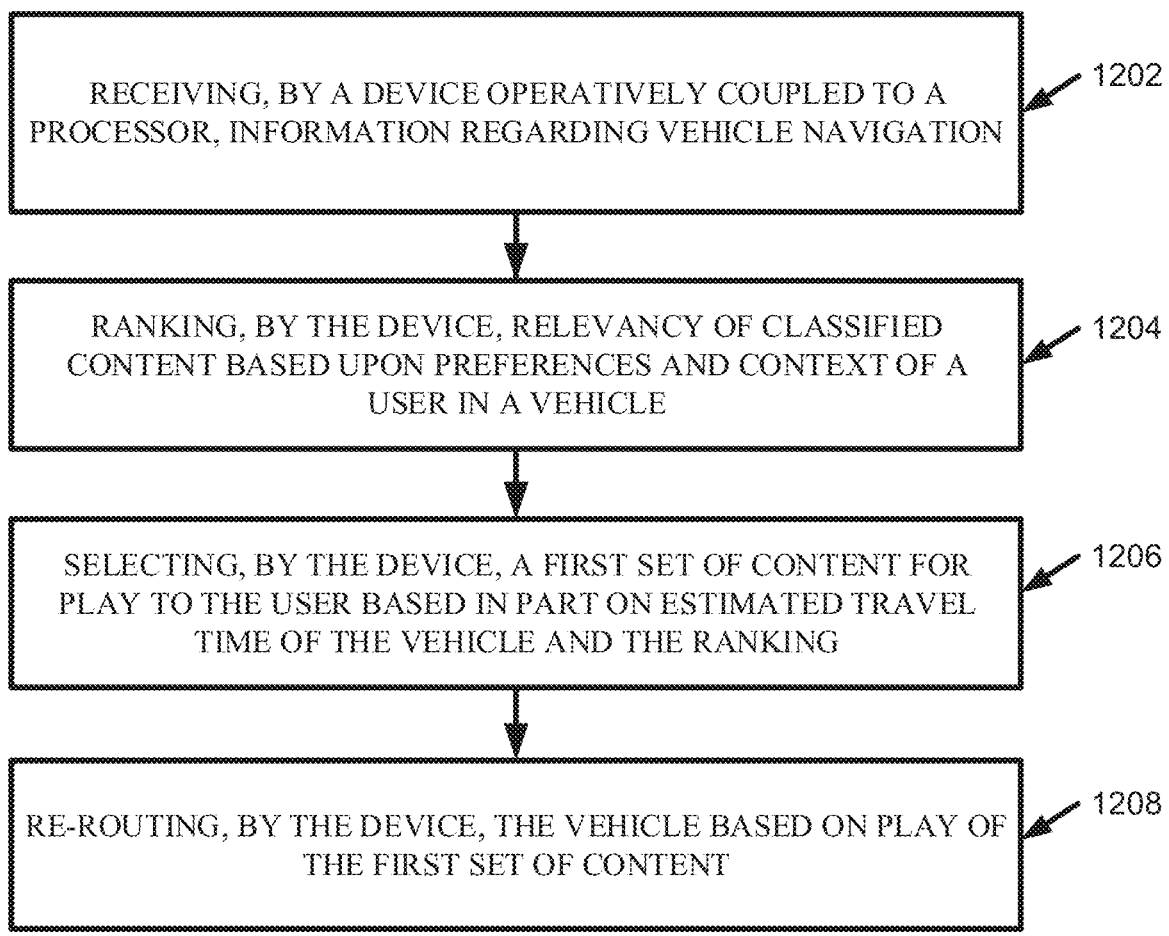

ALIGNING CONTENT PLAYBACK WITH VEHICLE TRAVEL

TECHNICAL FIELD

Embodiments disclosed and claimed herein relate to content playback and techniques that facilitate corresponding the presentation of content within a vehicle to an estimated travel time of the vehicle and/or one or more entity preferences.

BACKGROUND

The presentation of audio and/or video content within a vehicle has become common in many traveling experiences. For example, vehicle drivers often listen to audio content (e.g., music and/or audible text) while driving, and riders often watch videos within the vehicle while waiting to reach their destination. During operation of the vehicle, travel time can be a function of several factors, such as distance to the destination, speed of the vehicle, traffic conditions, weather, and/or the like; however, the presentation of the content within the vehicle has conventionally remained independent of said factors.

As a result, playback of the content can be misaligned with the travel time of the vehicle and/or the preferences of one or more persons within the vehicle. For instance, the travel time of the vehicle can be shorter than the runtime of the subject content; thereby, playback of the content will not be complete by the time the vehicle reaches the intended destination. This can result in one or more persons within the vehicle missing a desired portion of the content (e.g., missing the end of a movie). In another instance, preferred content may not be presented to one or more entities within the vehicle at least because other presented content consumed the available time during travel.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that facilitate aligning content playback with the estimated traveling time of a vehicle and/or one or more entity preferences are described.

According to an embodiment, a system for aligning content playback with the estimated traveling time of a vehicle and/or one or more entity preferences is provided. The system can comprise a processor that executes computer executable components stored in memory. The system can comprise a travel component that can receive information regarding vehicle navigation. The system can also comprise a ranking component that can rank relevancy of classified content based upon preferences and context of an entity in a vehicle. Further, the system can comprise a content selection component that can select a first set of content for play to the entity based in part on estimated travel time of the vehicle and the relevancy of the classified content.

In some implementations, the system can further comprise an editing component that can edit the first set of content based on the estimated travel time of the vehicle. For example, the system can comprise a prioritization component that can prioritize subsets of the first set of content as a function of relevancy to or preference of the entity, and the editing component can prune the subsets of the first set of content as a function of the relevancy or preference of the entity. In another example, the ranking component ranks relevancy of the classified content based upon preferences and context of two or more individuals in the vehicle. Further, the system can comprise a content playback component that generates and respectively plays personalized streams of ranked content to a first entity and a second entity on respective playback devices. Additionally, the system can comprise a presentation component that controls presentation of the pruned content within the vehicle, and the first set of content can include at least one of: video content or audio content. In various embodiments, a runtime of the first set of contents can be edited and/or a playback speed of the first set of contents can be edited. Further, the editing component can edit the first set of content using an artificial intelligence technique that learns an entity preference from previous experiences. In other implementations, the system can comprise a routing component that can re-route the vehicle based on play of the first set of content. For example, the system can comprise a positioning component that can determine the estimated travel time of the vehicle based on position of the vehicle and a destination. Also, the system can comprise a guidance component that can generate a travel route to the destination based on the first set of content selected by the content selection component, and the travel route can be characterized by a second estimated travel time. In some implementations, the system can comprise an interrupt component that can interrupt playback of the classified content to play a second set of content based on dynamic prioritization, and the second subset of the content can be at least one of: an email, an instant message, a voicemail or a news alert. For example, the system can comprise a content suspension component that can suspend play of the first set of content within the vehicle based on at least one of: condition of the vehicle, an environmental condition, or behavior of the vehicle. In one or more embodiments, the system can also comprise a multi-modal component that can transfer play of first set of content from a first device to a second device.

In some embodiments, elements described in connection with the disclosed systems can be embodied in different forms such as a computer-implemented method, a computer program product, or another form.

According to another embodiment, a computer-implemented method for aligning content playback with the estimated traveling time of a vehicle and/or one or more entity preferences is provided. The computer-implemented method can comprise receiving, by a device operatively coupled to a processor, information regarding vehicle navigation. Also, the computer-implemented method can comprise ranking, by the device, relevancy of classified content based upon preferences and context of an entity in a vehicle. Further, the computer-implemented method can comprise selecting, by the device, a first set of content for play to the entity based in part on estimated travel time of the vehicle and the ranking.

In some implementations, the computer-implemented method can further comprise editing, by the device, the first set of content based on the estimated travel time of the vehicle. For example, the computer-implemented method can comprise prioritizing subsets of the first set of content as a function of relevancy to or preference of the entity. The editing can prune the subsets of the first set of content as a function of the relevancy or preference of the entity. In another example, the computer-implemented method can comprise ranking, by the device, relevancy of the classified content based upon preferences and context of two or more individuals in the vehicle. Further, the computer-implemented method can comprise generating and respectively playing, by the device, personalized streams of ranked content to a first entity and a second entity on respective playback devices. Additionally, the computer-implemented method can comprise controlling, by the device, presentation of the pruned content within the vehicle, and the edited content can include at least one of: video content or audio content. Further, the computer-implemented method can comprise generating, by the device, the edited content using artificial intelligence or machine learning. In other implementations, the computer-implemented method can comprise a re-routing, by the device, the vehicle based on play of first set of content. For example, the system can comprise a positioning component that can determine the estimated travel time of the vehicle based on position of the vehicle and a destination. In some implementations, the computer-implemented method can comprise interrupting, by the device, playback of the first set of content to play a second set of content based on dynamic prioritization, and the second subset of the content can be at least one of: an email, an instant message, a voicemail or a news alert. For example, the computer-implemented method can comprise transferring, by the device, play of first set of content from a first device to a second device.

According to another embodiment, a computer program product for aligning content with traveling time is provided. The computer-program product can comprise a computer readable storage medium having program instructions embodied therewith. The program instructions can be executable by a processor to cause the processor to receive information regarding vehicle navigation. The program instructions can also cause the processor to rank relevancy of classified content based upon preferences and context of an entity in a vehicle. The program instructions can further cause the processor to select a first set of content for play to the entity based in part on estimated travel time of the vehicle and the relevancy of the classified content.

In some implementations, the program instructions can further cause the processor to edit the first set of content based on the estimated travel time of the vehicle. For example, the program instructions can further cause the processor to prioritize subsets of the first set of content as a function of relevancy to or preference of the entity. The editing can prune the subsets of the first set of content as a function of the relevancy or preference of the entity. In various implementations, the program instructions can further cause the processor to re-route the vehicle based on play of the first set of content.

DESCRIPTION OF THE DRAWINGS

FIG. 11 illustrates a high-level flow diagram of an example, non-limiting method that facilitates aligning content playback with the estimated travel time of a vehicle and/or one or more entity preferences in accordance with one or more embodiments described herein.

FIG. 12 illustrates a high-level flow diagram of an example, non-limiting method that facilitates aligning content playback with the estimated travel time of a vehicle and/or one or more entity preferences in accordance with one or more embodiments described herein.

DETAILED DESCRIPTION

Figure 1:
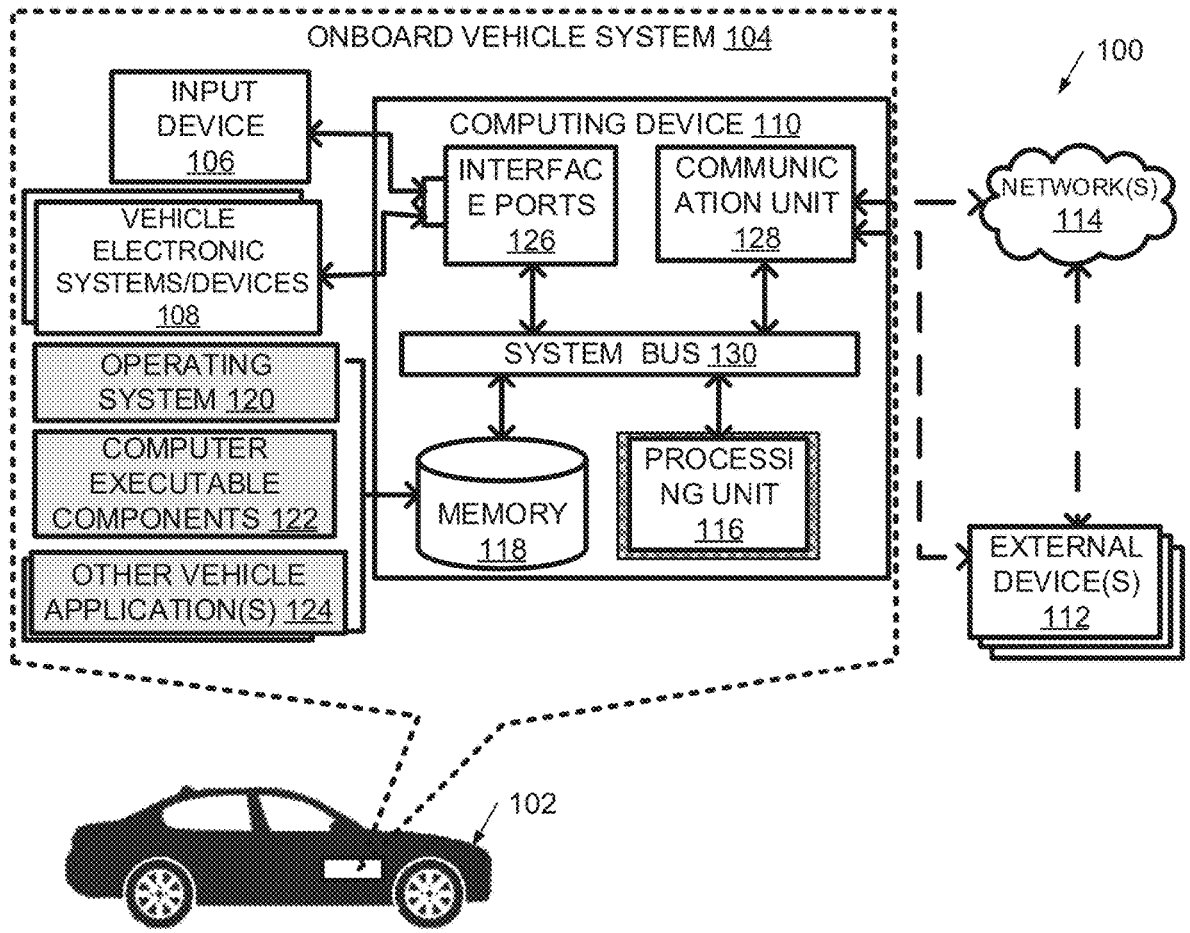
FIG. 1 illustrates a block diagram of an example, non-limiting system that facilitates aligning content playback with the estimated travel time of a vehicle and/or one or more entity preferences in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Given the problems with content runtime and vehicle travel time alignment discussed above; the present disclosure can be implemented to produce a solution to one or more of these problems in the form of autonomous manipulation of the content and/or navigational features of the vehicle. Various embodiments described herein can be directed to aligning content (e.g., video and/or audio content) playback with the estimated traveling time of a vehicle and/or one or more entity preferences. For example, the content playback and estimated traveling time can be aligned such that the runtime of the content is less than or equal to the length of the estimated traveling time. One or more entity defined preferences can delineate various parameters of the alignment. Further one or more artificial intelligence techniques can facilitate execution of the alignment.

In one or more embodiments, the alignment between content runtime and vehicle travel time can be facilitated by ranking the content by relevancy and selectively presenting the content based on the ranking. For example, one or more entities can delineate various parameters that characterize the relevancy of content, such as the relevancy of: content sources, content types, and/or topics regarded by the content. One or more devices (e.g., located in a vehicle) can thereby receive content and rank said content based on the relevancy parameters defined by the one or more entities. Further, the one or more devices can compose a set of the content based on the ranking, wherein the total runtime of the set of content can be less than or equal to the length of the vehicle's estimated travel time.

Also, in one or more embodiments, the alignment between content runtime and vehicle travel time can be facilitated by editing the content based on one or more entity preferences. For example, the content can be edited autonomously by one or more devices to alter (e.g., reduce) the runtime of the content. The editing can comprise altering the playback speed of the content, adding additional content to the content, and/or removing portions from the content. Further, the editing can be modulated by one or more entity preferences and/or can be facilitated by one or more artificial intelligence techniques.

Further, in one or more embodiments, the alignment between content runtime and vehicle travel time can be facilitated by re-routing the vehicle based on the content runtime and/or one or more entity defined preferences. For example, one or more autonomous devices can determine alternate travel routes that can be taken by the vehicle to reach the desired destination. The alternate travel routes can be characterized by different estimated travel times than the established travel time. For instance, one or more suggest alternate travel routes can achieve a lengthier estimated travel time than the currently established route (e.g., by adding distance to be traveled and/or reducing the maximum available speed of the vehicle). The alternate travel route can lengthen the estimated travel time so as to enable more time within the vehicle to facilitate presentation of the content. In other words, the one or more devices can re-route the vehicle to establish travel times that can facilitate the content runtime. Further, one or more entity preferences can modulate the amount of travel time that can be added or subtracted by the alternate route.

Additionally, various embodiments can implement all the features described herein. For example, various embodiments can comprise systems, devices, computer program products, and/or computer-implemented methods that can facilitate the alignment between content runtime and travel time by content ranking, content editing, and/or vehicle re-routing.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used in this disclosure, the terms "entity," "entities," "driver," "passenger," and the like refer to a machine, computer, robot device, computerized system, person, or combination thereof that can employ one or more of the embodiments described herein. For example, various embodiments described herein can interact with, be engaged by, and/or be operated by one or more entities autonomously (e.g., without human intervention). For instance, one or more entities can control (e.g., drive and/or pilot) the vehicle autonomously (e.g., without human intervention) by one or more software components facilitated by one or more machines.

The computer processing systems, computer-implemented methods, apparatus and/or computer program products described herein employ hardware and/or software to solve problems that are highly technical in nature (e.g., aligning content runtime with a vehicle's estimated travel time, editing digital content, and/or correlating near-instantaneous navigational information), that are not abstract and cannot be performed as a set of mental acts by a human. For example, a human, or even a plurality of humans, cannot efficiently, accurately and effectively manually analyze and/or prioritize the voluminous amounts of content that can be received while traveling with the same level of accuracy and/or efficiency as the various embodiments described herein. For instance, one or more embodiments described herein can analyze and/or process a vast amount of content (e.g., including a multitude of impending calls, texts, emails, messages, voicemails, music, videos, and the like) while a vehicle is operating. Further, said vast amount of content can be updated, prioritized, and/or modified during travel. In another example, time spent by an individual analyzing the content can be a direct detriment to the alignment between runtime and travel time. In other words, spending more time manually analyzing and/or manipulating the content can leave less time to present the content during travel.

FIG. 1 illustrates a block diagram of an example, non-limiting system 100 that facilitates aligning content playback with the estimated travel time of a vehicle 102 and/or one or more entity preferences in accordance with one or more embodiments described herein. In accordance with various exemplary embodiments, system 100 can be deployed on or within a vehicle 102, (e.g., an automobile, as shown in FIG. 1), to facilitate presenting various forms of content within the vehicle. Although FIG. 1 depicts the vehicle 102 as an automobile, the architecture of the system 100 is not so limited. For instance, the system described herein can be implemented with a variety of types of vehicles 102. Example vehicles 102 that can incorporate the exemplary system 100 can include, but are not limited to: automobiles, airplanes, trains, motorcycles, carts, trucks, semi trucks, buses, boats, recreational vehicles, helicopters, jets, scooters, a combination thereof, and/or the like.

As shown in FIG. 1, the system 100 can comprise one or more onboard vehicle systems 104, which can include one or more input devices 106, one or more other vehicle electronic systems and/or devices 108, and/or one or more computing devices 110. Additionally, the system 100 can comprise one or more external devices 112 that can be communicatively and/or operatively coupled to the one or more computing devices 110 of the one or more onboard vehicle systems 104 either via a one or more networks 114 and/or a direct electrical connection (e.g., as shown in FIG. 1).

The one or more input devices 106 can display one or more interactive graphic entity interfaces ("GUIs") that facilitate accessing and/or controlling various functions and/or application of the vehicle 102. The one or more input devices 106 can display one or more interactive GUIs that facilitate accessing and/or controlling various functions and/or applications. The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touchscreens, mice, a combination thereof, and/or the like. An entity of the system 100 can utilize the one or more input devices 106 to input data into the system 100. Additionally, the one or more input devices 106 can comprise one or more displays that can present one or more outputs generated by the system 100 to an entity. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

For example, the one or more input devices 106 can comprise a touchscreen that can present one or more graphical touch controls that can respectively correspond to a control for a function of the vehicle 102, an application, a function of the application, interactive data, a hyperlink to data, and the like, wherein selection and/or interaction with the graphical touch control via touch activates the corresponding functionality. For instance, one or more GUIs displayed on the one or more input devices 106 can include selectable graphical elements, such as buttons or bars corresponding to a vehicle navigation application, a media application, a phone application, a back-up camera function, a car settings function, a parking assist function, and/or the like. In some implementations, selection of a button or bar corresponding to an application or function can result in the generation of a new window or GUI comprising additional selectable icons or widgets associated with the selected application. For example, selection of the media application can result in generation of a new GUI or window that includes additional buttons or widgets for different media sources (e.g., radio, a streaming music system, music from an auxiliary input device or phone, etc.), different radio stations, volume controls, and the like. The type and appearance of the controls can vary. For example, the graphical touch controls can include icons, symbols, widgets, windows, tabs, text, images, a combination thereof, and/or the like.

The one or more input devices 106 can comprise suitable hardware that registers input events in response to touch (e.g., by a finger, stylus, gloved hand, pen, etc.). In some implementations, the one or more input devices 106 can detect the position of an object (e.g., by a finger, stylus, gloved hand, pen, etc.) over the one or more input devices 106 within close proximity (e.g., a few centimeters) to touchscreen without the object touching the screen. As used herein, unless otherwise specified, reference to "on the touchscreen" refers to contact between an object (e.g., an entity's finger) and the one or more input devices 106 while reference to "over the touchscreen" refers to positioning of an object within close proximity to the touchscreen (e.g., a defined distance away from the touchscreen) yet not contacting the touchscreen.

The type of the input devices 106 can vary and can include, but is not limited to: a resistive touchscreen, a surface capacitive touchscreen, a projected capacitive touchscreen, a surface acoustic wave touchscreen, and an infrared touchscreen. In various embodiments, the one or more input devices 106 can be positioned on the dashboard of the vehicle 102, such as on or within the center stack or center console of the dashboard. However, the position of the one or more input devices 106 within the vehicle 102 can vary.

The one or more other vehicle electronic systems and/or devices 108 can include one or more additional devices and/or systems (e.g., in addition to the one or more input devices 106 and/or computing devices 110) of the vehicle 102 that can be controlled based at least in part on commands issued by the one or more computing devices 110 (e.g., via one or more processing units 116) and/or commands issued by the one or more external devices 112 communicatively coupled thereto. For example, the one or more other vehicle electronic systems and/or devices 108 can include: a media system (e.g., audio and/or video); a back-up camera system; a heating, ventilation, and air conditioning ("HVAC") system; a lighting system; a cruise control system, a power locking system, a navigation system, an autonomous driving system, a vehicle sensor system, a combination thereof, and/or the like.

The one or more computing devices 110 can facilitate executing and controlling one or more operations of the vehicle 102, including one or more operations of the one or more input devices 106, and the one or more other vehicle electronic systems/devices 108 using machine-executable instructions. In this regard, embodiments of system 100 and other systems described herein can include one or more machine-executable components embodied within one or more machines (e.g., embodied in one or more computer readable storage media associated with one or more machines, such as computing device 110). Such components, when executed by the one or more machines (e.g., processors, computers, virtual machines, etc.) can cause the one or more machines to perform the operations described.

For example, the one or more computing devices 110 can include or be operatively coupled to at least one memory 118 and/or at least one processing unit 116. The one or more processing units 116 can be any of various available processors. For example, dual microprocessors and other multiprocessor architectures also can be employed as the processing unit 116. In various embodiments, the at least one memory 118 can store software instructions embodied as functions and/or applications that when executed by the at least one processing unit 118, facilitate performance of operations defined by the software instruction. In the embodiment shown, these software instructions can include one or more operating system 120, one or more computer-executable components 122, and/or one or more other vehicle applications 124. For example, the one or more operating systems 120 can act to control and/or allocate resources of the one or more computing devices 110. It is to be appreciated that the claimed subject matter can be implemented with various operating systems or combinations of operating systems.

The one or more computer executable components 122 and/or the one or more other vehicle applications 124 can take advantage of the management of resources by the one or more operating systems 120 through program modules and program data also stored in the one or more memories 118. The one or more computer executable components 122 can provide various features and/or functionalities that can facilitate aligning content playback with the estimated travel time of a vehicle 102 and/or one or more entity preferences and/or controlling the one or more other vehicle applications 124. Example, other vehicle applications 124 can include, but are not limited to: a navigation application, a media player application, a phone application, a vehicle settings application, a parking assistance application, an emergency roadside assistance application, a combination thereof, and/or the like. The features and functionalities of the one or more computer executable components 122 are discussed in greater detail infra.

The one or more computing devices 110 can further include one or more interface ports 126, one or more communication units 128, and a system bus 130 that can communicatively couple the various features of the one or more computing devices 110 (e.g., the one or more interface ports 126, the one or more communication units 128, the one or more memories 118, and/or the one or more processing units 116). The one or more interface ports 126 can connect the one or more input devices 106 (and other potential devices) and the one or more other vehicle electronic systems/devices 108 to the one or more computing devices 110. For example, the one or more interface ports 126 can include, a serial port, a parallel port, a game port, a universal serial bus ("USB") and the like.

The one or more communication units 128 can include suitable hardware and/or software that can facilitate connecting one or more external devices 112 to the one or more computing devices 110 (e.g., via a wireless connection and/or a wired connection). For example, the one or more communication units 128 can be operatively coupled to the one or more external devices 112 via one or more networks 114. The one or more networks 114 can include wired and/or wireless networks, including but not limited to, a personal area network ("PAN"), a local area network ("LAN"), a cellular network, a wide area network ("WAN", e.g., the Internet), and the like. For example, the one or more external devices 112 can communicate with the one or more computing devices 110 (and vice versa) using virtually any desired wired or wireless technology, including but not limited to: wireless fidelity ("Wi-Fi"), global system for mobile communications ("GSM"), universal mobile telecommunications system ("UMTS"), worldwide interoperability for microwave access ("WiMAX"), enhanced general packet radio service (enhanced "GPRS"), fifth generation partnership project ("5G") communication system, third generation partnership project ("3GPP") long term evolution ("LTE"), third generation partnership project 2 ("3GPP2") ultra-mobile broadband ("UMB"), high speed packet access ("HSPA"), Zigbee and other 802.XX wireless technologies and/or legacy telecommunication technologies, near field communication ("NFC") technology, BLUETOOTH®, Session Initiation Protocol ("SIP"), ZIGBEE®, RF4CE protocol, WirelessHART protocol, 6LoWPAN (IPv6 over Low power Wireless Area Networks), Z-Wave, an ANT, an ultra-wideband ("UWB") standard protocol, and/or other proprietary and non-proprietary communication protocols. In this regard, the one or more communication units 128 can include software, hardware, or a combination of software and hardware that is configured to facilitate wired and/or wireless communication between the one or more computing devices 110 and the one or more external devices 112. While the one or more communication units 128 are shown for illustrative clarity as a separate unit that is not stored within memory 118, it is to be appreciated that one or more (software) components of the communication unit can be stored in memory 118 and include computer executable components.

The one or more external devices 112 can include any suitable computing device comprising a display and input device (e.g., a touchscreen) that can communicate with the one or more computing devices 110 comprised within the onboard vehicle system 104 and interface with the one or more computer executable components 122 (e.g., using a suitable application program interface ("API")). For example, the one or more external devices 112 can include, but are not limited to: a mobile phone, a smartphone, a tablet personal computer ("PC"), a digital assistant ("PDA"), a heads-up display ("HUD"), virtual reality ("VR") headset, an augmented reality ("AR") headset, or another type of wearable computing device, a desktop computer, a laptop computer, a computer tablet, a combination thereof, and the like.

Figure 2:
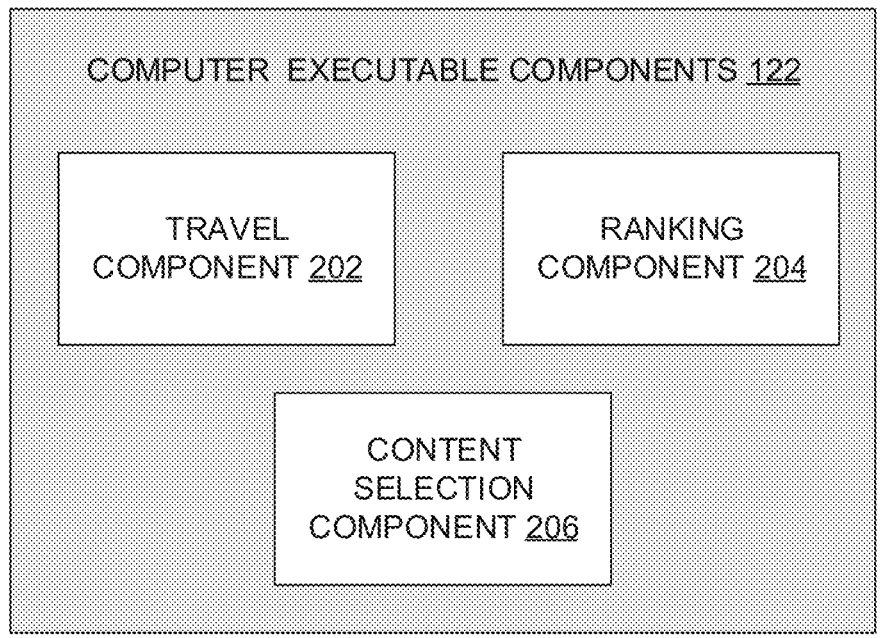
FIG. 2 illustrates a block diagram of example, non-limiting computer executable components that facilitate selecting content for presentation in a vehicle based on an estimated travel time and/or one or more entity preferences in accordance with one or more embodiments described herein.

FIG. 2 illustrates a block diagram of example, non-limiting computer executable components 122 that can facilitate selecting content for presentation in a vehicle based on an estimated travel time and/or one or more entity preferences in accordance with one or more embodiments described herein. Repetitive description of like elements employed in other embodiments described herein is omitted for sake of brevity. As shown in FIG. 2, the one or more computer executable components 122 can include travel component 202, ranking component 204, and/or content selection component 206.

The travel component 202 can receive information regarding vehicle 102 navigation. Example information regarding vehicle 102 navigation can include, but is not limited to: the speed of the vehicle 102, the type of vehicle 102, the destination of the vehicle 102, the travel route of the vehicle 102, the estimated travel time of the vehicle 102, traffic conditions that the vehicle 102 can and/or is expected to encounter during traveling, weather conditions that the vehicle 102 can and/or is expected to encounter during traveling, a current position of the vehicle 102, a past position of the vehicle 102, a starting location of the vehicle 102, one or more arranged stops of the vehicle 102 (e.g., one or more arranged fuel stops and/or passenger drop-off stops), a combination thereof, and/or the like. In various embodiments the travel component 202 can receive information from: the one or more input devices 106, the one or more external devices 112, the one or more vehicle electronic systems and/or devices 108, one or more other computer executable components 122, the operating system 120, one or more other vehicle applications 124, a combination thereof, and/or the like.

For example, an entity of the system 100 (e.g., a driver of the vehicle 102) can utilize the one or more input devices 106 and/or external devices 112 (e.g., a computerized device, such as a smartphone) to enter navigational information (e.g., the destination of the vehicle 102) into the system 100. The navigational information can be collected, processes, and/or otherwise analyzed by one or more other computer executable components 122 and/or other vehicle applications 124. For instance, navigational information regarding the vehicle 102, and/or entered by an entity, can be processed via one or more navigational applications. One of ordinary skill in the art will readily recognize that a variety of navigational applications (e.g., computer applications) can be capable of processing the vehicle 102 navigational information described herein.

In a further example, one or more vehicle electronic systems and/or devices 108 can provide navigational information to the travel component 202. For instance, one or more global positioning systems ("GPS") can generate navigational information (e.g., the position of the vehicle 102) regarding the vehicle 102. Also, one or more sensors comprised within the vehicle 102 (e.g., comprised within the one or more vehicle electronic systems and/or devices 108) can facilitate in collecting and/or generating navigational information. Example sensors can include, but are not limited to: odometers, altimeters, speedometers, accelerometers, engine features and/or components, fuel meters, flow meters, cameras (e.g., digital cameras, heat cameras, infrared cameras, and/or the like), lasers, radar systems, microphones, vibration meters, moisture sensors, thermometers, seatbelt sensors, a combination thereof, and/or the like. For instance, a speedometer of the vehicle 102 can detect the vehicle's 102 traveling speed. Further, the one or more sensors can detect and/or measure one or more conditions outside the vehicle 102, such as: whether the vehicle 102 is traveling through a rainy environment; whether the vehicle 102 is traveling through winter conditions (e.g., snowy and/or icy conditions); whether the vehicle 102 is traveling through very hot conditions (e.g., desert conditions); and/or the like. Example navigational information can include, but is not limited to: the destination of the vehicle 102, the position of the vehicle 102, the type of vehicle 102, the speed of the vehicle 102, environmental conditions surrounding the vehicle 102, the planned route of the vehicle 102, traffic conditions expected to be encountered by the vehicle 102, operational status of the vehicle 102, a combination thereof, and/or the like.

In an additional example, navigational information can be autonomously generated, collected, and/or sent to the travel component 202 by the one or more external devices 112. For instance, one or more computerized devices (e.g., smartphones) located within the vehicle 102 can collect navigational information (e.g., via a GPS and/or one or more navigational applications) and send said information to the travel component 202. Further, one or more computerized devices (e.g., smartphones) can follow one or more standard operating protocols (e.g., one or more entity defined permissions) to generate and/or send the navigational information without manual interference and/or assistance of an entity. In another instance, the one or more external devices 112, can be one or more websites (e.g., one or more weather websites) that can send information to the travel component 202.

In one or more embodiments, the travel component 202 can generate an estimated travel time for the vehicle 102 based on the navigational information. Additional, or alternatively, in various embodiments an estimated travel time for the vehicle 102 can be comprised within the navigational information received by the travel component 202. Further, in various embodiments, the travel component 202 can receive an estimated travel time for the vehicle 102 and modified the estimated travel time based on other received navigational information to generate one or more new estimated travel times.

The ranking component 204 can rank the relevancy of content (e.g., classified content) based upon one or more preferences and/or contexts of an entity in the vehicle 102. The content can be received by the one or more computing devices 110 (e.g., via the one or more communication units 128) and/or stored in the one or more memories 118. In various embodiments, the content can be generated, processed, and/or otherwise analyzed by one or more other computer executable components 122, other vehicle applications 124, and/or vehicle electronic systems and/or devices 108. Example content can include, but is not limited to: messages (e.g., text messages, emails, video chats, voicemails, and/or the like); news alerts; audio content (e.g., music, audio books, radio, audible messages, recordings, voicemail, and/or the like), video content (e.g., movies, clips, images, visual messages, text, and/or the like), video game content, virtual reality content, augmented reality content, a combination thereof, and/or the like.

One or more preferences regarding the ranking performed by the ranking component 204 can be defined by an entity of the system 100 via the one or more input devices 106 and/or the one or more external devices 112. For example, an entity can define the relevancy of various types of content. For instance, the entity can define one type of content, such as message content (e.g., text messages, emails, video chats, voicemails, and/or the like), to be more relevant than another type of content, such as entertainment content (e.g., music, radio, audio books, and/or the like). In another instance, the entity can define a type of content, such as news alerts, to be the most or least type of content. In another example, an entity can define the relevancy of content based on the composition of the content. For instance, the entity can define relevancy based on the origin of the content (e.g., the sender of a message). In another instance, the entity can define relevancy based on one or more labels associated with the content (e.g., wherein the content is flagged as important by one or more applications, such as an email application). In a further instance, the entity can define relevancy based on a topic of interest regarded by the content.

In one or more embodiments, the ranking component 204 can determine whether the content meets and/or comprises one or more of the entity defined preferences using one or more artificial intelligence techniques. For example, the ranking component 204 can implement one or more: machine learning algorithms, artificial neural networks (e.g., deep neural networks), image recognition algorithms, classification algorithms, natural language processing algorithms (e.g., negative sampling and/or word embedding techniques), a combination thereof, and/or the like. For instance, the ranking component 204 can analyze the content for key features, such as key words or images, which can indicate the presence of one or more of the entity defined preferences. In another instance, the ranking component 204 can analyze the entity's interaction with the content to learn from past experience. If an entity quickly transitions from a first piece of ranked content to another (e.g., without completing presentation of the first piece of ranked content), the ranking component 204 can identify the first piece of ranked content as being mis-ranked and learn from the identification to more accurately rank future content.

For example, the one or more artificial intelligence techniques described herein can perform classifications, correlations, inferences and/or expressions associated with principles of artificial intelligence. For instance, machine learning techniques can employ an automatic classification system and/or an automatic classification. In one example, the one or more artificial intelligence techniques can employ a probabilistic and/or statistical-based analysis (e.g., factoring into the analysis utilities and costs) to learn and/or generate inferences. Additionally, the one or more artificial intelligence techniques can employ any suitable machine-learning based techniques, statistical-based techniques and/or probabilistic-based techniques, such as, but not limited to: expert systems, fuzzy logic, SVMs, Hidden Markov Models ("HMMs"), greedy search algorithms, rule-based systems, Bayesian models (e.g., Bayesian networks), neural networks, other non-linear training techniques, data fusion, utility-based analytical systems, systems employing Bayesian models, a combination thereof, and/or the like. In another aspect, the one or more artificial intelligence techniques can perform a set of machine learning computations, such as: a set of clustering machine learning computations; a set of logistic regression machine learning computations; a set of decision tree machine learning computations; a set of random forest machine learning computations; a set of regression tree machine learning computations; a set of least square machine learning computations, a set of instance-based machine learning computations; a set of regression machine learning computations; a set of support vector regression machine learning computations; a set of k-means machine learning computations; a set of spectral clustering machine learning computations; a set of rule learning machine learning computations, a set of Bayesian machine learning computations; a set of deep Boltzmann machine computations; a set of deep belief network computations; a set of different machine learning computations, a combination thereof and/or the like.

Additionally, one or more contexts regarding the ranking performed by the ranking component 204 can be defined by an entity of the system 100 via the one or more input devices 106 and/or the one or more external devices 112. For example, the entity can define one or more changes to the preferences based on one or more contexts, such as, but not limited to: the number of entities within the vehicle 102 (e.g., as determined by one or more sensors in the vehicle 102, such as the one or more seatbelt sensors); an account selected by the entity, the proximity of one or more of the external devices 112 to the vehicle 102; an estimated travel time of the vehicle 102, a combination thereof, and/or the like. For instance, the entity can define one or more types of content (e.g., originating from a particular source and/or regarding a particular topic) as classified content, which can be ranked of high relevance when the entity is alone in the vehicle 102 and low relevance (e.g., no relevance) when the entity is not alone in the vehicle 102. In another instance, the entity can define a first set of preferences associated with a first ranking account (e.g., a personal ranking account) and a second set of preferences associated with a second ranking account (e.g., a family ranking account), wherein the ranking component 204 can rank content based on the selected account.

The content selection component 206 can select a set of the content for play to one or more entities of the system 100 based in part on an estimated travel time of the vehicle 102, a ranking performed by the ranking component 204, and/or an instruction by an entity of the system 100. For example, content received and/or generated by the one or more communication units 128, the travel component 202, and/or the ranking component 204 can be stored in the one or more memories 118 and be accessible to the content selection component 206.

In one or more embodiments, the content selection component 206 can select a set of the content for play within the vehicle 102 based on the vehicle's 102 estimated travel time. For example, the content selection component 206 can select content having a runtime equal to or less than the length of the estimated travel time. For instance, wherein the estimated travel time is one hour, the content selection component 206 can select content that that has a runtime of equal to or less than one hour. In another example, the content selection component 206 can select multiple contents that have a combined runtime that is equal to or less than the estimated travel time of the vehicle 102. For instance, wherein the estimated travel time is one hour, the content selection component 206 can select multiple contents that can establish a total runtime (e.g., by playing the multiple contents sequentially) of equal to or less than one hour. For example, one or more versions of a piece of content can be received, generated, and/or stored by the one or more computing devices 110, wherein each version can have a respective runtimes. The content selection component 206 can thereby select one or more versions of the piece of content that is equal to or less than the length of the estimated travel time of the vehicle 102.

In various embodiments, the content selection component 206 can also, or alternatively, select a set of the content for play within the vehicle 102 based on the ranking performed by the ranking component 204. For example, wherein the total available content comprises a variety of content types and/or formats, the content selection component 206 can select the set based on one or more rankings performed by the ranking component 204. For instance, wherein the ranking component 204 generates a ranking in which messages are more relevant that news alerts, which in turn are more relevant than audio books; the content selection component 206 can first select messages to comprise the set of content, then select news alerts to comprise the set of content is available runtime exists, and then select one or more audio books to comprise the set of content is available runtime further exists.

In one or more embodiments, the content selection component 206 can further select the set of content based on one or more entity instructions (e.g., provided via the one or input devices 106 and/or external devices 112). For example, the entity can instruct the content selection component 206 to select the set from a particular category of the content. For instance, an entity of the system 100 can instruct the content selection component 206 to select one or more movies from the content, whereupon the content selection component 206 can further select the one or more movies based on the estimated travel time of the vehicle 102 and/or the ranking performed by the ranking component 204. In another example, the entity can instruct the content selection component 206 to select the set from a plurality of categories of content. For instance, an entity of the system 100 can instruct the content selection component 206 to select a set comprising messages and news alerts from the content, whereupon the content selection component 206 can further select the messages and/or news alerts based on the estimated travel time of the vehicle 102 and/or the ranking performed by the ranking component 204. In a further example, the entity can instruct the content selection component 206 to select a certain number of pieces of content from various content categories to comprise the select set of content. For instance, an entity of the system 100 can instruct the content selection component 206 to select content from up to a defined threshold of content categories (e.g., up to two content categories).

Figure 3:
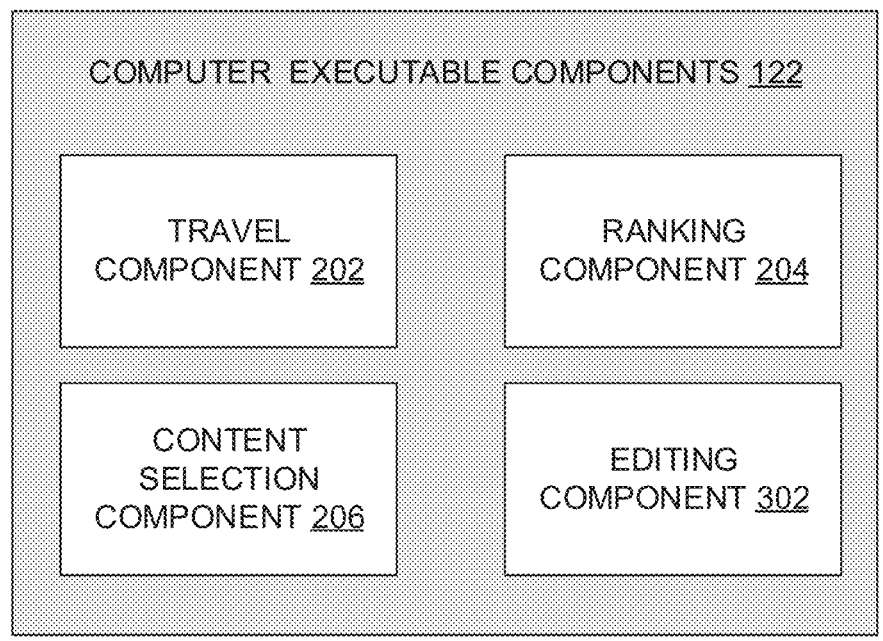
FIG. 3 illustrates a block diagram of example, non-limiting computer executable components that facilitate conforming content based on an estimated travel time and/or one or more entity preferences in accordance with one or more embodiments described herein.

FIG. 3 illustrates a block diagram of example, non-limiting computer executable components 122 that can facilitate conforming content based on an estimated travel time and/or one or more entity preferences in accordance with one or more embodiments described herein. Repetitive description of like elements employed in other embodiments described herein is omitted for sake of brevity. As shown in FIG. 3, the computer executable components 122 can further comprise editing component 302.

The editing component 302 can edit content to coincide with the estimated travel time of the vehicle 102. For example, content received and/or generated by the one or more communication units 128, the travel component 202, and/or the ranking component 204 can be stored in the one or more memories 118 and be accessible to the editing component 302. Further, edited content generated by the editing component 302 can be accessible to the content selection component 206 for selecting the set of content for play (e.g., the edited content can be stored in the one or more memories 118).

In various embodiments, the editing component 302 can alter the runtime of subject content by adding or removing portions of the content and/or adjusting the playback speed of the content. Example instances of adding or removing portions of the content can include, but are not limited to, adding or removing: scenes from video content (e.g., from a movie); versus from music content (e.g., from a song); chapters from audio book content; sentences from text-to-speech content (e.g., from messages), a combination thereof, and/or the like. Adjusting the playback speed of the content can include generating one or more versions of the content wherein the content is played faster or slower by a defined multiple. For instance, editing the playback speed of a subject piece of content can include increasing the playback speed of the content by a multiple (e.g., three times) the original playback speed.

In addition, the editing component 302 can alter the runtime of the content based on one or more preferences of an entity of the system 100. As described herein, the one or more preferences can be entered into the system 100 via the one or more input devices 106 and/or the one or more external devices 112. The one or more entity preferences can regard, for example, how the content is edited and/or a predilection for one or more content compositions. For example, the editing component 302 can alter the playback speed of the content rather than add or remove portions of the content based on a defined preference of the entity to favor faster playback speeds. In another example, the editing component 302 can add or remove portions of the content based on the one or more preferences of the entity. For instance, the editing component 302 can remove credit scenes from a movie based on an entity preference indicating a disinterest in the credits. In another instance, the editing component 302 can remove dialog scenes from video content (e.g., a movie) based on an entity preference indicating a favorability of action scenes. In one or more embodiments, the editing component 302 can implement one or more artificial intelligence technologies (e.g., machine learning, artificial neural networks, natural language processing, a combination thereof, and/or the like) to facilitate execution of the editing described herein.

Figure 4:
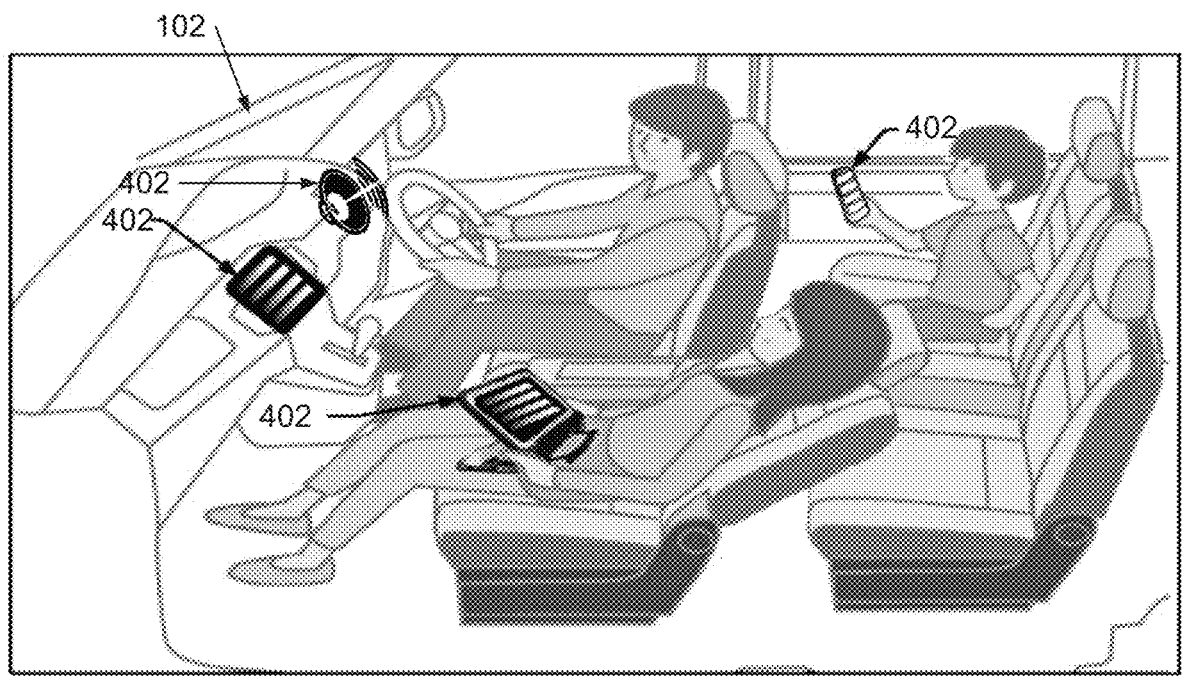
FIG. 4 illustrates a diagram of an example, non-limiting vehicle interior that can facilitate the presentation of one or more forms of content across one or more platforms for one or more entities in accordance with one or more embodiments described herein.

FIG. 4 illustrates a diagram of an example, non-limiting vehicle 102 interior that can facilitate the presentation of one or more streams of content across one or more platforms for one or more entities in accordance with one or more embodiments described herein. Repetitive description of like elements employed in other embodiments described herein is omitted for sake of brevity. As show in FIG. 4, one or more playback devices 402 can be located within the vehicle 102.

The one or more playback devices 402 can facilitate presentation of the selected content (e.g., select by the content selection component 206) within the vehicle 102. Playback devices 402 can be one or more devices through which the content, or a portion of the content, can be presented (e.g., visually, audibly, physically, a combination thereof, and/or the like) to an entity. Example playback devices 402 can include, but are not limited to: computers, laptops, touchscreens, computer tablets, digital displays, heads-up displays ("HUD"), virtual reality devices, augmented reality devices, vibration devices, haptic devices, smartphones, smart wearables (e.g., smart watches), a combination thereof, and/or the like. For instance, FIG. 4 depicts an exemplary embodiment that includes: a touchscreen playback device 402 comprised within the vehicle's 102 center console; a speaker playback device 402 comprised within the vehicle's 102 dash; a computer tablet playback device 402 located in a passenger's lap; and a smartphone playback device 402 located in another passenger's hand.

In one or more embodiments, the playback devices 402 can be comprised within various features of the system 100. For example, one or more playback devices 402 can be comprised within the one or more input devices 106, vehicle electronic systems and/or devices 108, and/or external devices 112. For instance, the touchscreen playback device 402 and/or the speaker playback device 402 depicted in FIG. 4 can be comprised within the one or more vehicle electronic systems and/or devices 108 of the system 100 (e.g., as shown in FIG. 4). Further, the computer tablet playback device 402 depicted in FIG. 4 can be comprised within one or more input devices 106 of the system 100 (e.g., as shown in FIG. 4). Moreover, the smartphone playback device 402 depicted in FIG. 4 can be comprised within one or more external devices 112 of the system 100 (e.g., as shown in FIG. 4).

Figure 5:
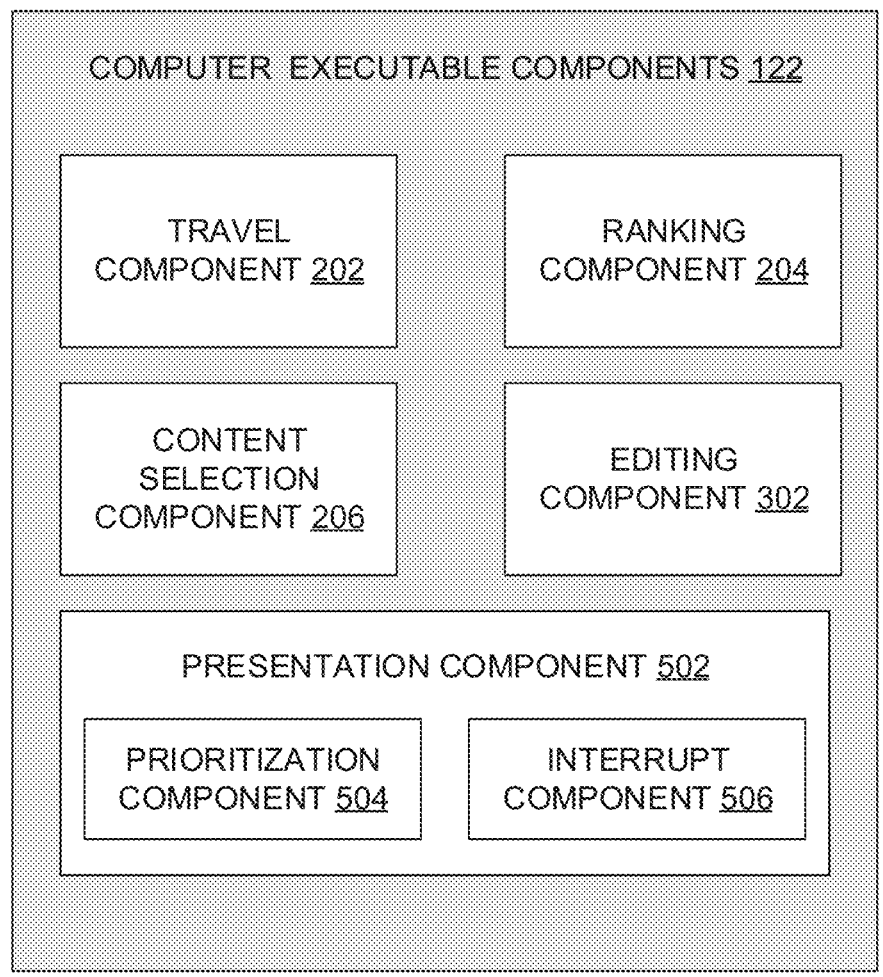
FIG. 5 illustrates a block diagram of example, non-limiting computer executable components that facilitate presenting content within a vehicle in accordance with one or more embodiments described herein.

FIG. 5 illustrates a block diagram of example, non-limiting computer executable components 122 that can facilitate presenting content within the vehicle 102 in accordance with one or more embodiments described herein. Repetitive description of like elements employed in other embodiments described herein is omitted for sake of brevity. As shown in FIG. 5, the computer executable components 122 can further comprise presentation component 502, which can also comprise prioritization component 504 and/or interrupt component 506.

The presentation component 502 can control presentation of the selected content (e.g., select by the content selection component 206) within the vehicle 102. For example, the presentation component 502 can be operatively coupled (e.g., via a direct electrical connection and/or a wireless connection) to one or more input devices 106, vehicle electronic systems and/or devices 108, and/or external devices 112. Further, the presentation component 502 can control the one or more input devices 106, vehicle electronic systems and/or devices 108, and/or external devices 112 to control presentation of the selected content (e.g., edited content selected to coincide with the estimated travel time of the vehicle 102 and/or one or more rankings defined by entity preferences and/or context). For instance, the one or more input devices 106, vehicle electronic systems and/or devices 108, and/or external devices 112 can comprise speakers to project audio content and/or screens to display video content in accordance with one or more signals generated by the presentation component 502.

The prioritization component 504 can prioritize one or more subsets of the set of contents selected by the content selection component 206 as a function of relevancy to, or preference of, an entity of the system 100. For example, wherein the content selection component 206 selects multiple pieces of content, the prioritization component 504 can generate a play order of the selected content that is in accordance with the ranking performed by the ranking component 204. For instance, wherein two messages and an audio book chapter are selected for play by the content selection component 206 (e.g., based on the estimated travel time), the prioritization component 504 can further define a play order in which the two messages are played before the audio book chapter in accordance with an entity defined preference that gives messages a higher relevance than audio books.

The interrupt component 506 can interrupt playback of the content to play another set of content based on a dynamic prioritization. The dynamic prioritization can be based on a preference of an entity of the system 100 and/or a ranking performed by the ranking component 204. While the set of content is being presented, the interrupt component 506 can monitor content that is being received and/or analyzed by the one or more computing devices 110. Wherein the monitored content is highly prioritized, the interrupt component 506 can interrupt playback of the set of content by presenting the newly monitored content. For example, an entity can define a preference for a first type of content (e.g., message content, such as instant messages and/or emails) to take priority over other forms of content being presented. Thereby, the interrupt component 506 can interrupt the presentation of the set of content (e.g., playback of a movie) with presentation of a newly received first type of content (e.g., new received message content).

Figure 6:
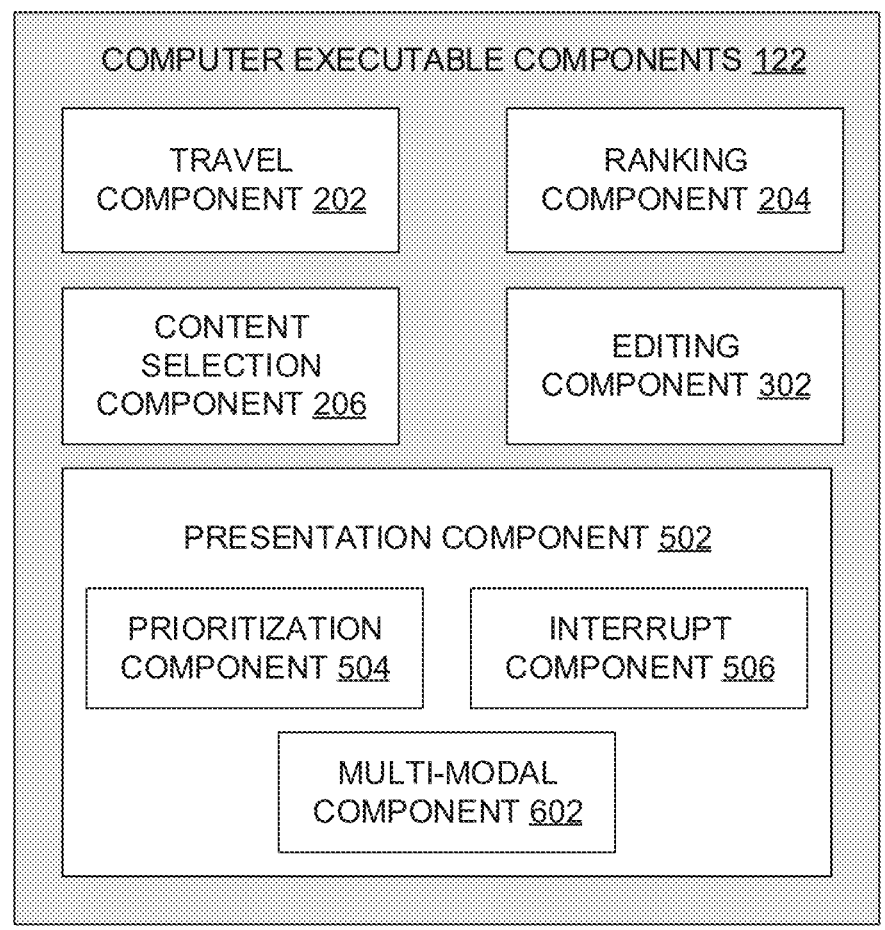
FIG. 6 illustrates a block diagram of example, non-limiting computer executable components that facilitate presenting content within a vehicle and/or across multiple platforms in accordance with one or more embodiments described herein.

FIG. 6 illustrates a block diagram of example, non-limiting computer executable components 122 can that facilitate presenting content within the vehicle 102 and/or across multiple platforms in accordance with one or more embodiments described herein. Repetitive description of like elements employed in other embodiments described herein is omitted for sake of brevity. As shown in FIG. 6, the presentation component 502 can further comprise multi-modal component 602.

The multi-modal component 602 can transfer play of classified content (e.g., one or more sets of content selected by the content selection component 206) from one or more first playback devices 402 to one or more second playback devices 402. For example, the one or more first and/or second playback devices 402 can be comprised within the one or more input devices 106, vehicle electronic systems and/or devices 108, and/or external devices 112. In one or more embodiments, the presentation component 502 can begin presenting the set of content on one or more first devices (e.g., a display comprised within the one or more vehicle electronic systems and/or devices 108), and the multi-modal component 602 can transfer the playback to one or more second devices (e.g., another display comprised within the one or more vehicle electronic systems and/or devices and/or an external device 112). For example, the presentation component 502 can begin playback of the set of content on one or more display screens of the vehicle electronic systems and/or devices 108 (e.g., a digital display screen comprised within the vehicle 102), then the multi-modal component 602 can transfer presentation of the set of content to one or more external devices 112 (e.g., a smartphone and/or tablet).

Transferring the playback can comprise presenting the set of content on both the first device and the second device, or terminating presentation on the first device and initiating presentation on the second device. Further, the multi-modal component 602 can transfer play of the content across more than just two devices. For example, the multi-modal component 602 can transfer play of the content across three or more devices, which can be located within the vehicle 102 and/or outside the vehicle 102. In one or more embodiments, the multi-modal component 602 can initiate playback transfer between devices in response to one or more entity commands and/or preferences (e.g., entered into the system 100 via the one or more input devices 106 and/or external devices 112).

Figure 7:
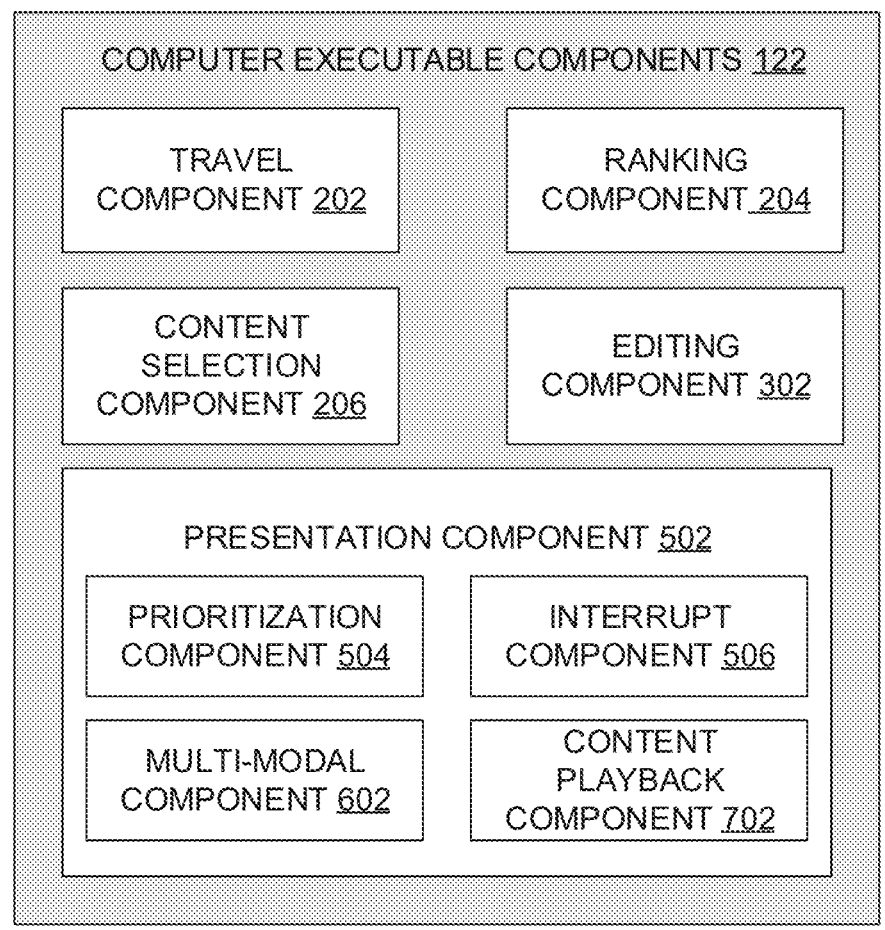
FIG. 7 illustrates a block diagram of example, non-limiting computer executable components that facilitate presenting various forms of content to a plurality of riders within a vehicle in accordance with one or more embodiments described herein.

FIG. 7 illustrates a block diagram of example, non-limiting computer executable components 122 that can facilitate presenting various forms of content to a plurality of riders within a vehicle in accordance with one or more embodiments described herein. Repetitive description of like elements employed in other embodiments described herein is omitted for sake of brevity. As shown in FIG. 7, the presentation component 502 can further comprise content playback component 702.

The content playback component 702 can generate and/or respectively play personalized streams of ranked content to a first entity and/or one or more second entities via respective playback devices 402. As described herein, the playback devices 402 can be comprised within the one or more input devices 106, vehicle electronic systems and/or devices 108, and/or external devices 112. In various embodiments, the content playback component 702 can manage the presentation of different sets of content to different entities within the vehicle 102 via respective playback devices 402. The content selection component 206 can generate a plurality of sets of content, each of which can have a unique composition based on respective entity preferences and can be presented on respective playback devices 402 via instruction from the content playback component 702.

For example, a first entity of the system 100 can sign into a first entity account and define one or more preferences and/or contexts to direct the performance of the ranking component 204, whereupon the content selection component 206 can generate a first set of content based on the vehicle's 102 estimated travel time and the ranking associated with the first entity account. Additionally, a second entity of the system 100 can sign into a second entity account and define one or more preferences and/or contexts to direct the performance of the ranking component 204, whereupon the content selection component 206 can generate a second set of content (e.g., comprising different content than the first set of the content) based on the vehicle's 102 estimated travel time and the ranking associated with the second entity account. The presentation component 502 can facilitate presentation of both the first and second set of content on one or more playback devices 402 (e.g., comprised within the one or more input devices 106, vehicle electronic systems and/or devices 108, and/or external devices 112), wherein the content playback component 702 can direct which set of content is presented on which playback device 402.

For instance, the content playback component 702 can direct playback of a first set of content associated with the preferences of the driver of the vehicle 102 to a playback device 402 that can easily interact with the driver (e.g., to a playback device 402 located near the driver seat of the vehicle 102). Further, the content playback component 702 can direct playback of a second set of content associated with the preferences of a passenger of the vehicle 102 to another playback device 402 that can easily interact with the passenger (e.g., to a playback device 402 located near a passenger seat in the vehicle 102). In addition, the content playback component 702 is not limited to managing just two playback devices 402; rather, the content playback component 702 can manage various streams of content (e.g., three or more playback streams) across various playback devices 402 (e.g., three or more playback devices 402) located in various features of the system 100 (e.g., located in the one or more input devices 106, vehicle electronic systems and/or devices 108, and/or external devices 112).

Figure 8:
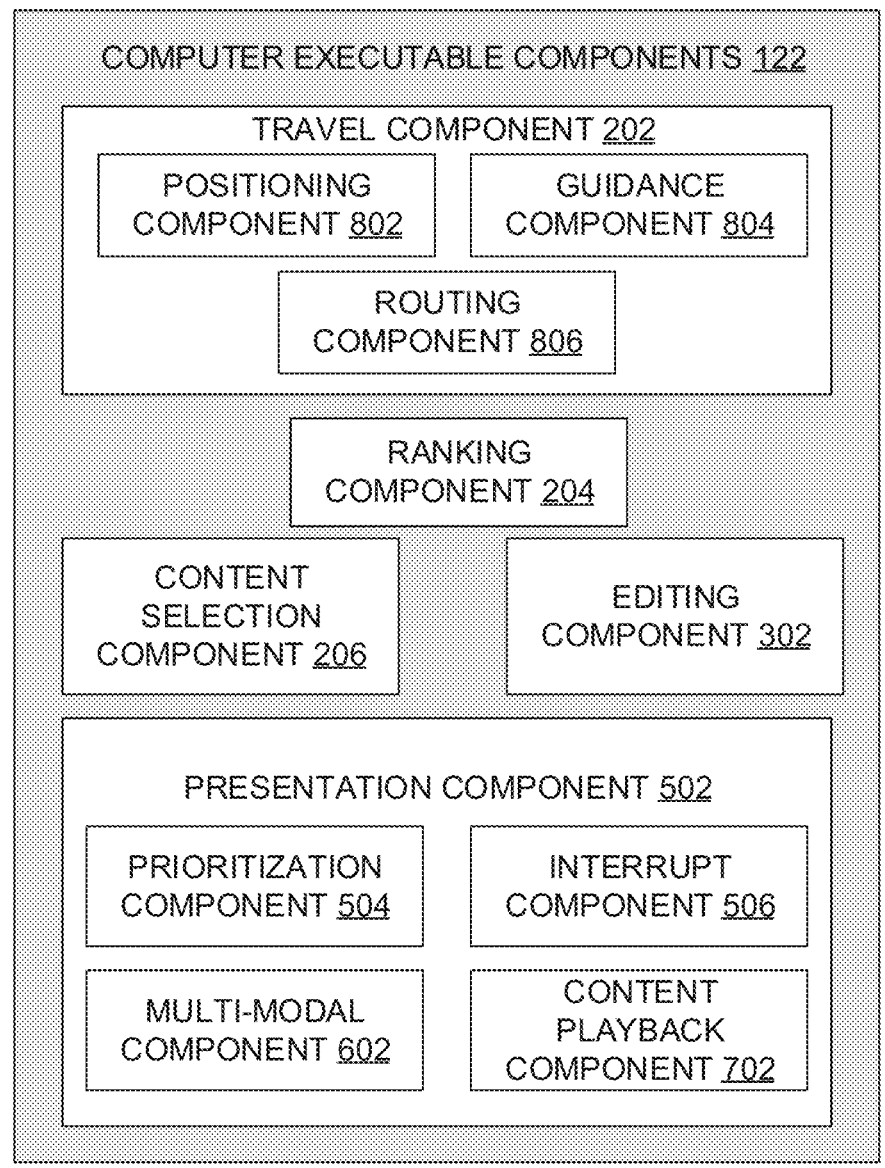
FIG. 8 illustrates a diagram of example, non-limiting computer executable components that facilitate controlling one or more navigational features of a vehicle to align an estimated travel time of the vehicle with the runtime of one or more selected contents in accordance with one or more embodiments described herein.

FIG. 8 illustrates a diagram of example, non-limiting computer executable components 122 that can facilitate controlling one or more navigational features of the vehicle 102 to align an estimated travel time of the vehicle 102 with the runtime of one or more selected contents in accordance with one or more embodiments described herein. Repetitive description of like elements employed in other embodiments described herein is omitted for sake of brevity. As shown in FIG. 8, the travel component 202 can further comprise positioning component 802, guidance component 804, and/or routing component 806.

In one or more embodiments, the travel component 202 can alter one or more features of the vehicle's 102 navigation to facilitate an alignment of one or more selected sets of content and an estimated travel time of the vehicle 102. For example, the one or more computing devices 110 can diminish the extent of editing done to the content (e.g., by the editing component 302) by lengthening the estimated travel time of the vehicle 102 to provide more available time for playback of the content. For instance, the travel component 202 can lengthen the estimated travel time by altering the course of the vehicle 102 and/or the speed of the vehicle 102. In various embodiments, the content editing described herein can be performed in conjunction with one or more navigational alterations facilitated by the travel component 202. Additionally, an entity of the system 100 can set one or more thresholds (e.g., via the one or more input devices 106 and/or external devices 112) to regulate the extent to which an estimated travel time can be lengthened. For example, an entity can limit the extent to which an estimated travel time can be lengthened to a defined time constraint (e.g., an extension less than or equal to ten percent of the original estimated travel time).

The positioning component 802 can determine the estimated travel time of the vehicle 102 based on the received navigational information described herein, such as the position of the vehicle 102, the destination of the vehicle 102, and/or the speed of the vehicle 102. The guidance component 804 can generate one or more alternative routes to the vehicle's 102 desired destination. For example, the guidance component 804 can identify different roadways that can be taken to reach the destination from the vehicle's 102 current position. Further, the positioning component 802 can determine the respective estimated travel times for each alternative route. For example, the positioning component 802 can determine the estimated travel time for each alternative route based on: the distance the vehicle 102 would travel on each respective route; the speed the vehicle 102 would travel on each respective route (e.g., the speed limit for the one or more roadways comprising the respective route); traffic conditions likely to be experienced on each respective route (e.g., whether the vehicle 102 will likely encounter traffic congestion while traveling the respective route); one or more vehicle 102 conditions likely to be encountered while traveling each respective route (e.g., whether the vehicle 102 will need to stop for fuel), a combination thereof, and/or the like.

The routing component 806 can subsequently re-route the vehicle 102 to coincide with play of the content. For example, the routing component 806 can select the alternate route that has an estimated travel time that best coincides with the runtime of the set of content. Further, the presentation component 502 can present the selected alternate route to one or more entities of the system 100 (e.g., a driver of the vehicle 102) via one or more playback devices 402 and/or the one or more vehicle electronic systems and/or devices 108.

In one or more embodiments, the one or computing devices 110 can facilitate alignment between the runtime of the content and vehicle's estimated travel time by creating one or more subsets of the content via a ranking based on entity defined preferences. In one or more embodiments, the one or more computing devices 110 can facilitate alignment between the runtime of the content and the vehicle's 102 estimated travel time by solely implementing the content editing features described herein (e.g., implemented by the ranking component 204, content selection component 206, and/or editing component 302). In one or more embodiments, the one or more computing devices 110 can facilitate alignment between the runtime of the content and the vehicle's 102 estimated travel time by solely implementing the vehicle 102 re-routing features described herein (e.g., implemented by the travel component 202, the positioning component 802, the guidance component 804, and/or the routing component 806). Alternatively, in various embodiments, the one or more computing devices 110 can facilitate alignment between the runtime of the content and the vehicle's 102 estimated travel time through a combination of the content editing and vehicle 102 re-routing features described herein.

For example, an entity of the system 100 can define (e.g., via the one or more input devices 106 and/or external devices 112) a preference for content editing the content rather than re-routing the vehicle 102, in which case the one or more computing devices 110 can implement merely the editing features described herein. In another example, an entity of the system 100 can define (e.g., via the one or more input devices 106 and/or external devices 112) a preference for re-routing the vehicle 102 rather than content editing the content, in which case the one or more computing devices 110 can implement merely the re-routing features described herein. In a further example, an entity of the system 100 can define (e.g., via the one or more input devices 106 and/or external devices 112) a preference for both content editing the content and re-routing the vehicle 102, in which case the one or more computing devices 110 can implement both the editing features and the re-routing features described herein. For instance, the one or more computing devices 110 can reach a balance, or near balance, between the amount of time added to travel via the vehicle 102 re-routing features and the amount of runtime subtracted from the content via the editing features. In another instance, the entity can define one or more thresholds regarding the time added to travel via the vehicle 102 re-routing features and/or the amount of runtime subtracted from the content via the editing features, wherein the one or more computing devices 110 can implement the described editing and/or re-routing features in accordance with the respective thresholds.

Figure 9:
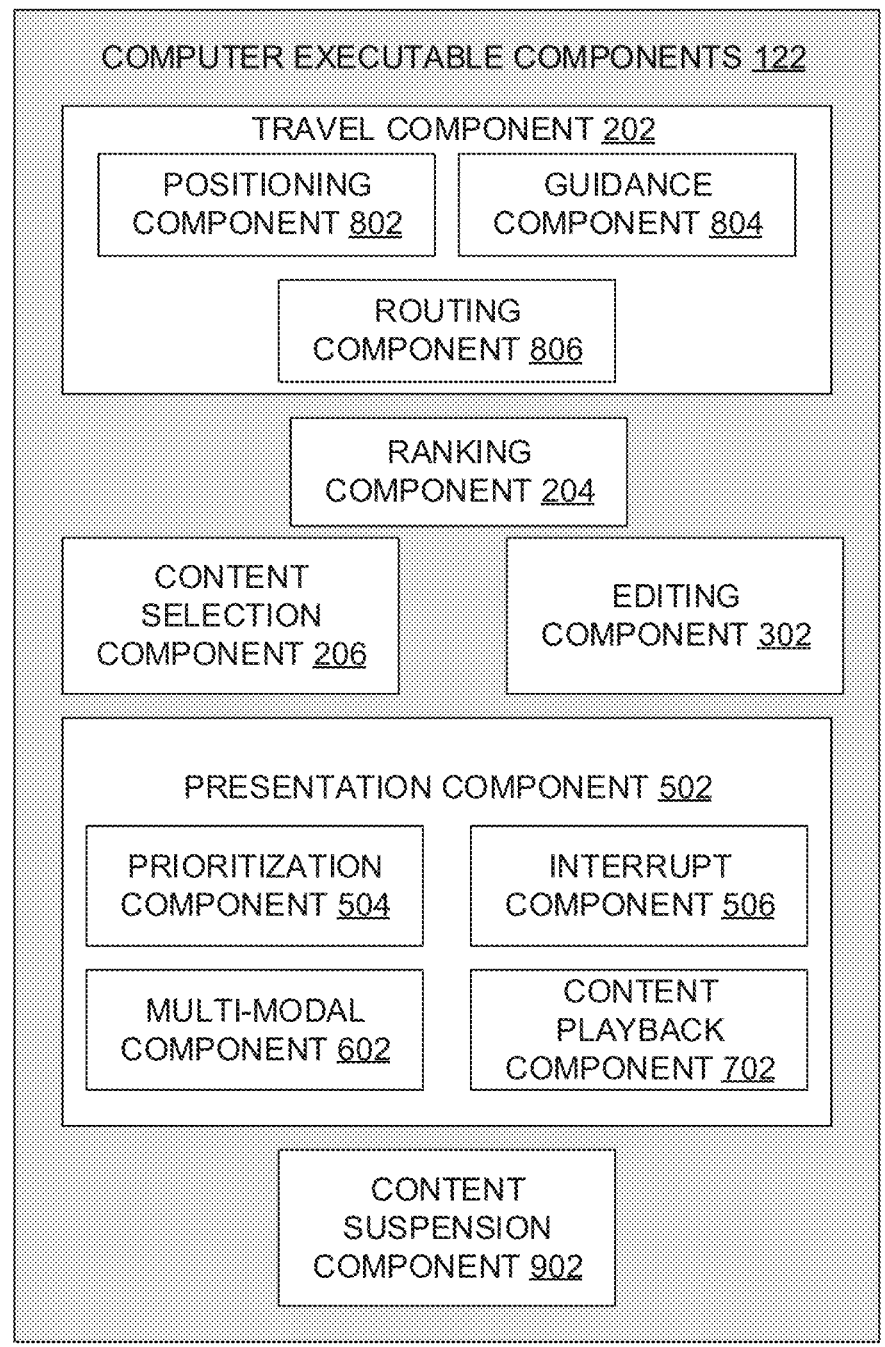
FIG. 9 illustrates a diagram of example, non-limiting computer executable components that facilitate controlling the presentation of content based at least in part on one or more driving conditions of a vehicle in accordance with one or more embodiments described herein.

FIG. 9 illustrates a diagram of example, non-limiting computer executable components 122 that can facilitate controlling the presentation of content based at least in part on one or more driving conditions of the vehicle 102 in accordance with one or more embodiments described herein. Repetitive description of like elements employed in other embodiments described herein is omitted for sake of brevity. As shown in FIG. 9, the one or more computer executable components 122 can further comprise content suspension component 902.

The content suspension component 902 can suspend play of the content within the vehicle 102 based on at least the condition of the vehicle 102, an environmental condition, and/or a behavior of the vehicle 102. In various embodiments, the content suspension component 902 can suspend play of the content during one or more hazardous condition in order to minimize distractions to one or more entities of the system (e.g., the driver of the vehicle 102).

For example, the content suspension component 902 can suspend playback of the content and/or resume playback of the content based on contextual factors and/or scenarios regarding the vehicle 102. The one or more vehicle electronic systems and/or devices 108 can monitor and/or determine contextual parameters in association with operation of the vehicle 102 to facilitate suspension and/or resuming playback of the content. Example contextual information that can be monitored by the one or more vehicle electronic systems and/or devices 108 and facilitate the performance of the content suspension component 902 can include, but are not limited to: a driving mode or mobility state of the vehicle 102 (e.g., on/off, in park, in drive, in neutral, in reverse, manual, automatic, etc.); the vehicle's 102 speed; the vehicle's 102 location; the vehicle's route (e.g., deviation from the original route and/or a selected alternate route); the vehicle's 102 status (e.g., normal, emergency state, broken down, collision state, etc.); a time of day; current traffic levels; current weather; number and identity of other passengers in the vehicle 102; identity of vehicle 102 driver; number of external devices 112 connected to the one or more computing devices 110; a combination thereof; and/or the like.

Figure 10:
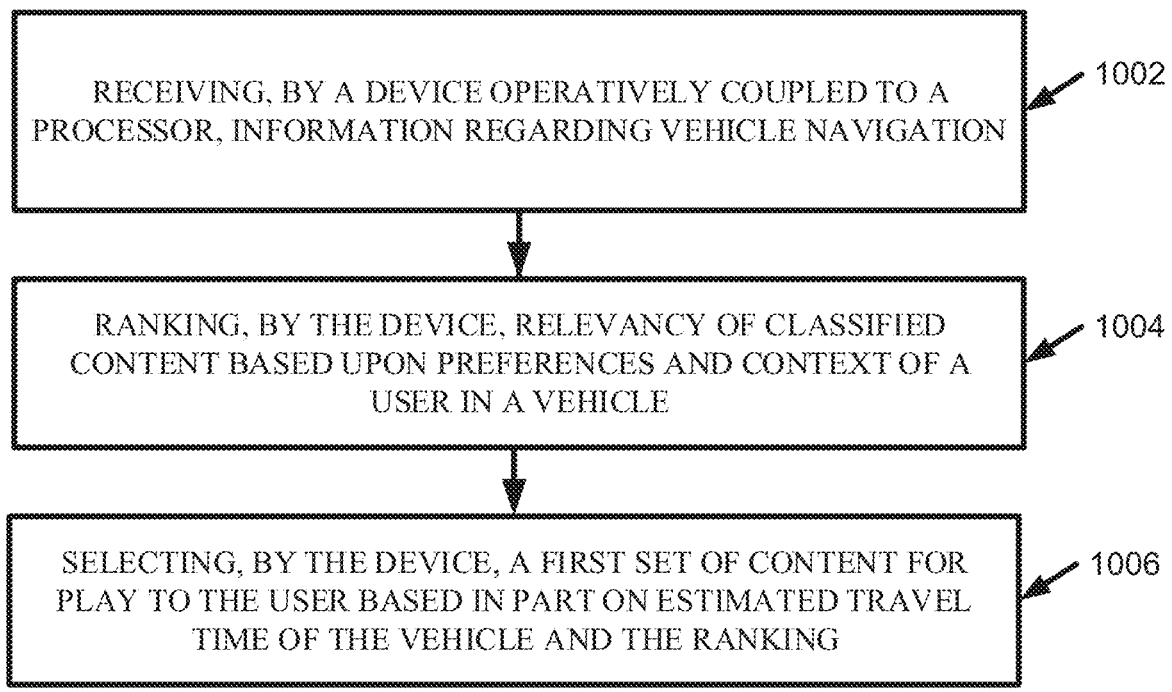
FIG. 10 illustrates a high-level flow diagram of an example, non-limiting method that facilitates aligning content playback with the estimated travel time of a vehicle and/or one or more entity preferences in accordance with one or more embodiments described herein.

FIG. 10 illustrates a high-level flow diagram of an example, non-limiting method 1000 that facilitates aligning content playback with the estimated travel time of a vehicle 102 and/or one or more entity preferences in accordance with one or more embodiments described herein. Repetitive description of like elements employed in other embodiments described herein is omitted for sake of brevity.

At 1002, the method 1000 can comprise receiving (e.g., via the communications unit 128 and/or one or more networks 114), by a device (e.g., one or more computing devices 110) operatively coupled to a processor (e.g., processing unit 116), information regarding vehicle navigation. For example, the receiving at 1002 can be performed in accordance with the various features described herein regarding travel component 202. For instance, the received information can be navigational information of a vehicle 102, such as: the destination of the vehicle 102, the position of the vehicle 102, the type of vehicle 102, the speed of the vehicle 102, environmental conditions surrounding the vehicle 102 (e.g., present or expected), the planned route of the vehicle 102, traffic conditions expected to be encountered by the vehicle 102, operational status of the vehicle 102, a combination thereof, and/or the like. Further, the information can be received from one or more input devices 106, vehicle electronic systems and/or devices 108, other vehicle applications 124, and/or external devices 112.

At 1004, the method 1000 can comprise ranking, by the device, relevancy of classified content based upon preferences and/or context of an entity in a vehicle 102. For example, the ranking at 1004 can be performed in accordance with the various features described herein regarding ranking component 204. For instance, an entity can define (e.g., via one or more input devices 106 and/or external devices 112) one or more preferences that delineate the relevancy of content (e.g., textual content, video content, and/or audio content) received by the device (e.g., the one or more computing devices 110). Further, the received content can be ranked in accordance with the defined preferences (e.g., and/or using one or more artificial intelligences techniques).

At 1006, the method 1000 can comprise selecting, by the device, a first set of content for play to the entity based in part on estimated travel time of the vehicle 102. For example, the selecting at 1006 can be performed in accordance with the various features described herein regarding content selection component 206. For instance, the estimated travel time can be received at 1002 or determined from the information received at 1002. Further, the set of content can be derived from the ranking at 1004 and/or one or more entity preferences. The set of content can be the ranked content or a portion of the ranked content. Moreover, the set of content can be selected based on the estimated travel time such that the runtime of the content can be equal to or less than the length of the estimated travel time. Thereby, the device (e.g., the one or more computing devices 110) can align the runtime of the content with the estimated travel time by ranking and/or prioritizing content based on entity defined preferences and/or contexts.

FIG. 11 illustrates a high-level flow diagram of an example, non-limiting method 1100 that facilitates aligning content playback with the estimated travel time of a vehicle 102 and/or one or more entity preferences in accordance with one or more embodiments described herein. Repetitive description of like elements employed in other embodiments described herein is omitted for sake of brevity.

At 1102, the method 1100 can comprise receiving (e.g., via the communications unit 128 and/or one or more networks 114), by a device (e.g., one or more computing devices 110) operatively coupled to a processor (e.g., processing unit 116), information regarding vehicle navigation. For example, the receiving at 1102 can be performed in accordance with the various features described herein regarding travel component 202. For instance, the received information can be navigational information of a vehicle 102, such as: the destination of the vehicle 102, the position of the vehicle 102, the type of vehicle 102, the speed of the vehicle 102, environmental conditions surrounding the vehicle 102 (e.g., present or expected), the planned route of the vehicle 102, traffic conditions expected to be encountered by the vehicle 102, operational status of the vehicle 102, a combination thereof, and/or the like. Further, the information can be received from one or more input devices 106, vehicle electronic systems and/or devices 108, other vehicle applications 124, and/or external devices 112.

At 1104, the method 1100 can comprise ranking, by the device, relevancy of classified content based upon preferences and/or context of an entity in a vehicle 102. For example, the ranking at 1104 can be performed in accordance with the various features described herein regarding ranking component 204. For instance, an entity can define (e.g., via one or more input devices 106 and/or external devices 112) one or more preferences that delineate the relevancy of content (e.g., textual content, video content, and/or audio content) received by the device (e.g., the one or more computing devices 110). Further, the received content can be ranked in accordance with the defined preferences (e.g., and/or using one or more artificial intelligences techniques).

At 1106, the method 1100 can comprise editing, by the device, a first set of content based on an estimated travel time of the vehicle 102. For example, the editing at 1106 can be performed in accordance with the various features described herein regarding the editing component 302. For instance, the estimated travel time can be received at 1102 or determined from the information received at 1102. Further, the editing can alter the runtime of the ranked content by adjusting the content's playback speed and/or adding or removing portions of the content. Moreover, the editing can be performed in accordance to one or more entity preference (e.g., entered via the one or more input devices 106 and/or external devices 112), which can delineate, for example, a preferred editing method and/or content composition. In various embodiments, the editing can reduce the runtime of the content to a length that is equal to or less than the length of the estimated travel time.

At 1108, the method 1100 can comprise selecting, by the device, the first set of content for play to the entity based in part on the estimated travel time of the vehicle 102. For example, the selecting at 1108 can be performed in accordance with the various features described herein regarding content selection component 206. For instance, the set of content can be derived from the ranking at 1104, the editing at 1106, and/or one or more entity preferences. The set of content can be the ranked and edited content or a portion of the ranked and edited content. Moreover, the set of content can be selected based on the estimated travel time such that the runtime of the content can be equal to or less than the length of the estimated travel time. Thereby, the device (e.g., the one or more computing devices 110) can align the runtime of the content with the estimated travel time by editing the content based on entity defined preferences and/or contexts.

At 1110, the method 1100 can comprise prioritizing, by the device, subsets of the first set of content as a function of relevancy to or preference of the entity. For example, the prioritizing at 1110 can be performed in accordance with various features described herein regarding prioritization component 504. For instance, a play order can be established for the content comprised within the selected set of content. The play order can be established based on one or more entity defined preferences. Further, respective play orders can be established for multiple individuals in the vehicle 102, as described herein.

At 1112, the method 1100 can comprise controlling, by the device, presentation of the first set of content within the vehicle 102, wherein the first set of content can include at least one of: video content or audio content. For example, the controlling at 1112 can be performed in accordance with the various features described herein regarding presentation component 502. For instance, controlling the presentation of the first set of content can comprise managing one or more playback devices 402, which can present the subject content to one or more entities within the vehicle 102. Further, the controlling can comprise managing multiple streams of content to respective playback devices 402, wherein each stream can have a respective content composition based on one or more varying entity preferences (e.g., based on the preferences associated with one or more entity accounts). Additionally, the presentation of content can be transferred between playback devices 402, as described herein.

FIG. 12 illustrates a high-level flow diagram of an example, non-limiting method 1200 that facilitates aligning content playback with the estimated travel time of a vehicle 102 and/or one or more entity preferences in accordance with one or more embodiments described herein. Repetitive description of like elements employed in other embodiments described herein is omitted for sake of brevity.

At 1202, the method 1200 can comprise receiving (e.g., via the communications unit 128 and/or one or more networks 114), by a device (e.g., one or more computing devices 110) operatively coupled to a processor (e.g., processing unit 116), information regarding vehicle navigation. For example, the receiving at 1202 can be performed in accordance with the various features described herein regarding travel component 202. For instance, the received information can be navigational information of a vehicle 102, such as: the destination of the vehicle 102, the position of the vehicle 102, the type of vehicle 102, the speed of the vehicle 102, environmental conditions surrounding the vehicle 102 (e.g., present or expected), the planned route of the vehicle 102, traffic conditions expected to be encountered by the vehicle 102, operational status of the vehicle 102, a combination thereof, and/or the like. Further, the information can be received from one or more input devices 106, vehicle electronic systems and/or devices 108, other vehicle applications 124, and/or external devices 112.

At 1204, the method 1200 can comprise ranking, by the device, relevancy of classified content based upon preferences and/or context of an entity in a vehicle 102. For example, the ranking at 1204 can be performed in accordance with the various features described herein regarding ranking component 204. For instance, an entity can define (e.g., via one or more input devices 106 and/or external devices 112) one or more preferences that delineate the relevancy of content (e.g., textual content, video content, and/or audio content) received by the device (e.g., the one or more computing devices 110). Further, the received content can be ranked in accordance with the defined preferences (e.g., and/or using one or more artificial intelligences techniques).

At 1206, the method 1200 can comprise selecting, by the device, a first set of content for play to the entity based in part on estimated travel time of the vehicle 102. For example, the selecting at 1206 can be performed in accordance with the various features described herein regarding content selection component 206. For instance, the estimated travel time can be received at 1002 or determined from the information received at 1002. Further, the set of content can be derived from the ranking at 1004 and/or one or more entity preferences. The set of content can be the ranked content or a portion of the ranked content. Moreover, the set of content can be selected based on the estimated travel time such that the runtime of the content can be equal to or less than the length of the estimated travel time.

At 1208, the method 1200 can comprise re-routing, by the device, the vehicle 102 based on play of the first set of content. For example, the re-routing at 1208 can be performed in accordance with the various features described herein regarding travel component 202 (e.g., positioning component 802, guidance component 804, and/or routing component 806). For instance, the re-routing at 1208 can comprising altering one or more navigational parameters of the vehicle 102 to lengthen the estimated travel time such that the new length of the estimated travel time is equal to or greater than the runtime of the selected content. Alternative routes to the desired destination can be selected to lengthen the estimated travel time. Also, the alternative routs lengthen the estimated travel time by, for example: increasing the distance traveled by the vehicle 102; reducing the speed of the vehicle 102; increasing the amount of traffic congestion experienced by the vehicle 102, a combination thereof, and/or the like. Moreover, one or more entity defined preferences can modulate the amount of time added to the estimated travel time due to the re-routing. Thereby, the device (e.g., the one or more computing devices 110) can align the runtime of the content with the estimated travel time by re-routing the vehicle based on entity defined preferences and/or contexts.

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture ("ISA") instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays ("FPGA"), or programmable logic arrays ("PLA") can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit ("ASIC"), a digital signal processor ("DSP"), a field programmable gate array ("FPGA"), a programmable logic controller ("PLC"), a complex programmable logic device ("CPLD"), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
    a processor;
    a memory communicatively coupled to the processor, the memory having stored therein computer executable components, comprising;
        a travel component that receives information regarding vehicle navigation;
        a ranking component that ranks relevancy of classified content based upon preferences and context of an entity in a vehicle; and
        a content selection component that selects a first set of content for play to the entity based in part on estimated travel time of the vehicle and the relevancy of the classified content.

2. The system of claim 1, further comprising an editing component that edits the first set of content based on the estimated travel time of the vehicle.

3. The system of claim 2, further comprising a prioritization component that prioritizes subsets of the first set of content as a function of relevancy to or preference of the entity, wherein the editing component prunes the subsets of the first set of content as a function of the relevancy or preference of the entity.

4. The system of claim 1, further comprising a routing component that re-routes the vehicle based on play of the classified content.

5. The system of claim 2, further comprising a presentation component that controls presentation of the pruned content within the vehicle, wherein the first set of content includes at least one of: video content or audio content.

6. The system of claim 1, further comprising an interrupt component that interrupts playback of the classified content to play a second set of content based on dynamic prioritization, wherein the second set of content is at least one of: an email, an instant message, a voicemail or a news alert.

7. The system of claim 1, further comprising a multi-modal component that transfers play of the first set of content from a first device to a second device.

8. The system of claim 1, wherein the ranking component ranks relevancy of the classified content based upon preferences and context of two or more individuals in the vehicle.

9. The system of claim 8, further comprising a content playback component that generates and respectively plays personalized streams of ranked content to a first entity and a second entity on respective playback devices.

10. The system of claim 2, wherein runtime of the first set of content is edited.

11. The system of claim 2, wherein playback speed of the first set of content is edited.

12. The system of claim 1, further comprising a positioning component that determines the estimated travel time of the vehicle based on position of the vehicle and a destination.

13. The system of claim 12, further comprising a guidance component that generates a travel route to the destination based on the first set of content selected by the content selection component, wherein the travel route is characterized by a second estimated travel time.

14. The system of claim 2, wherein the editing component edits the first set of content using an artificial intelligence technique that learns entity preferences from previous experiences.

15. The system of claim 2, wherein the editing component edits the first set of content based on entity preference regarding composition of edited content.

16. The system of claim 1, further comprising a content suspension component that suspends play of the first set of content within the vehicle based on at least one of: condition of the vehicle, an environmental condition, or behavior of the vehicle.

17. A computer-implemented method, comprising:
receiving, by a device operatively coupled to a processor, information regarding vehicle navigation;
ranking, by the device, relevancy of classified content based upon preferences and context of an entity in a vehicle; and
selecting, by the device, a first set of content for play to the entity based in part on estimated travel time of the vehicle and the ranking.

18. The computer-implemented method of claim 17, further comprising editing, by the device, the first set of content based on the estimated travel time of the vehicle.

19. The computer-implemented method of claim 18, further comprising prioritizing, by the device, subsets of the first set of content as a function of relevancy to or preference of the entity, wherein the editing prunes the subsets of the first set of content as a function of the relevancy or preference of the entity.

20. The computer-implemented method of claim 17, further comprising re-routing, by the device, the vehicle based on play of the first set of content.

21. The computer-implemented method of claim 18, further comprising controlling, by the device, presentation of the first set of content within the vehicle, wherein the first set of content includes at least one of: video content or audio content.

22. The computer-implemented method of claim 17, further comprising interrupting, by the device, playback of the first set of content to play a second set of content based on dynamic prioritization, wherein the second set of content is at least one of: an email, an instant message, a voicemail or a news alert.

23. The computer-implemented method of claim 17, further comprising transferring, by the device, play of classified content from a first device to a second device.

24. The computer-implemented method of claim 17, further comprising ranking, by the device, relevancy of the classified content based upon preferences and context of two or more individuals in the vehicle.

25. The computer-implemented method of claim 24, further comprising generating and respectively playing, by the device, personalized streams of ranked content to a first entity and a second entity on respective playback devices.

26. The computer-implemented method of claim 17, further comprising generating, by the device, edited content using artificial intelligence or machine learning.

27. A computer program product for aligning content with travel time, the computer program product comprising a non-transitory computer readable medium having program instructions embodied therewith, the program instructions executable by a processor to cause the processor to:
receive information regarding vehicle navigation;
rank relevancy of classified content based upon preferences and context of an entity in a vehicle; and
select a first set of content for play to the entity based in part on estimated travel time of the vehicle and the relevancy of the classified content.

28. The computer program product of claim 27, wherein the program instructions further cause the processor to edit the first set of content based on the estimated travel time of the vehicle.

29. The computer program product of claim 28, wherein the program instructions further cause the processor to prioritize subsets of the first set of content as a function of relevancy to or preference of the entity, wherein the editing prunes the subsets of the first set of content as a function of the relevancy or preference of the entity.

30. The computer program product of claim 27, wherein the program instructions further cause the processor to re-route the vehicle based on play of the first set of content.

* * * * *